Patented Dec. 14, 1943

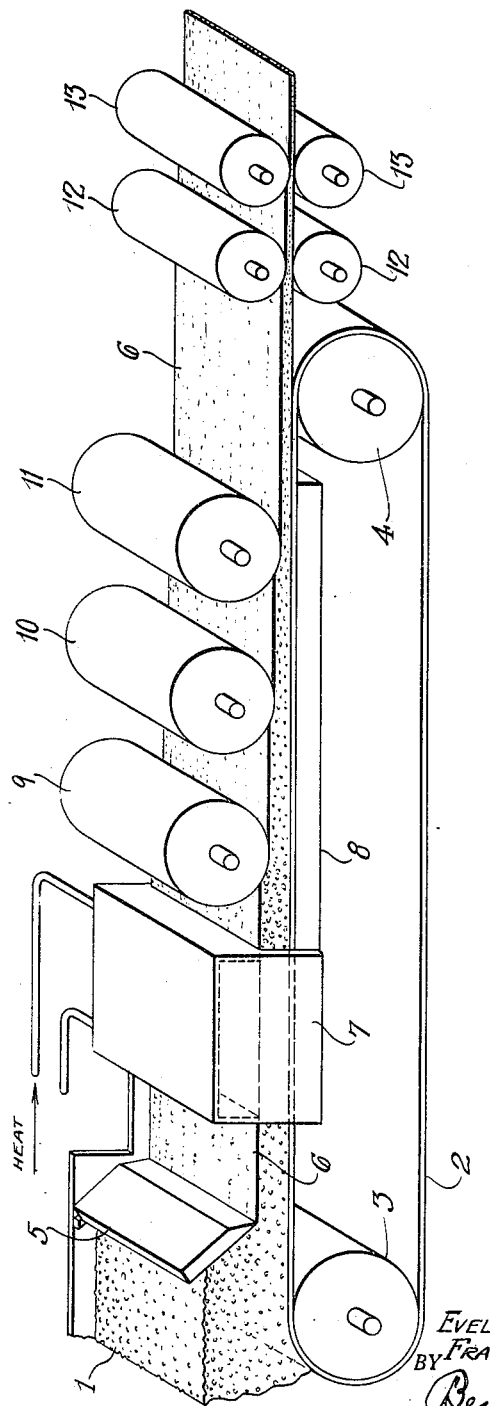

2,336,944

UNITED STATES PATENT OFFICE 2,336,944

MANUFACTURE OF RUBBER SHEETING

Evelyn William Madge, Sutton Coldfield, and Frank Theodore Purkis, Moseley, Birmingham, England, assignors to Dunlop Rubber Company Limited, London County, England, a British company Application January 29, 1941, Serial No. 376,474
In Great Britain June 25, 1940

8 Claims. (Cl. 18—48)

The present invention is for improvements in or relating to the manufacture of rubber sheeting.

Many methods of making rubber sheeting from masticated rubber and latex rubber are known and such sheeting has been used for diverse purposes. It is known that calendered sheet has a "grain" effect the resistance to tear being much smaller in one direction than in another. It is also known that unvulcanised rubber not only swells considerably when immersed in oils and liquid fuels and the like but also rapidly dissolves therein.

It is the object of this invention to provide a process for the production of compact and non-porous rubber sheeting having special properties, such as a high resistance to tear or high swelling properties without rapid dissolution in oils and liquid fuels and the like from frothed aqueous rubber dispersions.

According to the present invention a process for the production of compact and non-porous rubber sheeting from frothed aqueous dispersions of rubber and the like comprises applying the frothed aqueous rubber dispersions substantially uniformly to a backing surface causing or allowing the froth to set to a spongy or cellular structure of irreversible material compacting the spongy or cellular structure by pressure whilst the material is still in a wet condition and drying the thus compacted and non-porous rubber sheeting.

Preferably the aqueous dispersions of rubber which are employed are those which are or have been rendered capable of gelling on the application of heat or to which substances have been added to cause the dispersions to gel in the cold after a definite and controllable time interval. Dispersions frothed and set in the manner described in specification No. 1,852,447 are particularly suitable for the process of the present invention.

The rubber sheeting made by the process of this invention may possess distinctive special properties. For example if it is made from a substantially uncompounded frothed rubber dispersion and is unvulcanised, it has high swelling properties without rapid dissolution in petrol and the like fuels. It swells rapidly in 87 octane fuel but as the rubber is unmasticated the sheeting retains a network structure as it distends and solution into the fuel is greatly restricted. This type of sheeting is therefore suitable for use as a self-sealing protective covering for containers of petrol and the like fuels. When making this type of rubber sheeting it is preferred to employ a dispersion which contains zinc oxide in addition to the gelling agent, as the zinc oxide ensures good and uniform gelling.

If the rubber sheeting is made from a frothed dispersion containing vulcanising ingredients and, if desired, compounding ingredients, and is subsequently vulcanised, it has an exceptionally high resistance to tear. The resistance to tear is further enhanced if the dried sheet is submitted to a further consolidating treatment before vulcanisation. This treatment may take the form of a cold calendering operation using rollers of an even or preferably differential speed.

The following examples illustrate the process of the present invention.

*Example I*

This example illustrates the manufacture of unvulcanised rubber sheeting having high swelling properties without rapid dissolution in petrol and the like fuels.

A rubber latex mixing of the composition

| | Parts by weight |
|---|---|
| Rubber latex (60% rubber and 0.15% ammonia) | 100 |
| Casein | 0.25 |
| Potassium-castor-oil soap | 0.22 | is whipped to a froth until the final volume is six times the original volume. 2 parts of zinc oxide and 1 part of sodium silicofluoride by weight are added as aqueous dispersions to the froth and stirred in uniformly. The froth is spread to a gauge of 32 mm. on a horizontal flat surface and allowed to set. The gelled wet sheet is rolled by means of a hand roller of about 25 lb. weight until the thickness is about 10 mm., whereupon the sheet is passed twice through the nip between the rollers of a cold calender. The peripheral speed of the rollers is 15 feet per minute; the nip between the rollers has a gauge of 4 mm. for the first calendering and 2.7 mm. for the second calendering. During the course of these operations a large quantity of serum is expressed from the sheeting which becomes longer and wider. The sheeting is also toughened. The calendered sheet is rinsed in cold or warm water in order to remove any remaining soap and serum constituents and is dried for 45 hours at 55° C. The thickness of the finished sheet is 2.5 mm. and its specific gravity is 0.6–0.7.

*Example 2*

This example illustrates the manufacture of tear-resistant rubber sheeting.

A rubber latex mixing of the composition

| | Parts by weight |
|---|---|
| Rubber latex (60% rubber) | 100 |
| Sulphur | 1 |
| Zinc diethyldithiocarbamate | 0.3 |
| Lamp black | 0.05 |
| Potassium-castor-oil soap | 0.22 | is whipped to a froth until its final volume is five times its original volume, whereupon 2 parts of zinc oxide and 1 part of sodium silicofluoride by weight are uniformly mixed with the froth. The prepared froth is poured on a horizontal flat surface and spread to a thickness of substantially 32 mm. It is allowed to set in the cold and the wet spongy product so obtained is submitted to a preliminary compressing treatment by light rollers. The sheeting is then removed from the flat surface and passed through a cold calender several times, the nip of the calender being reduced after each pass until the spongy or cellular structure of the product is destroyed. During the compacting treatment a large amount of water is expressed from the sheeting. The compact and non-porous rubber sheeting so obtained is dried and vulcanised; if desired the sheeting may be partly or completely vulcanised during the drying operation. The final thickness of the sheeting is about 2.5 mm. It is extremely difficult for a person of average strength to tear the sheeting so prepared in whatever direction the stress be applied. On the other hand, it is quite easy to tear vulcanised rubber sheeting of the same thickness prepared from masticated rubber.

Because of the method of manufacture the thickness of rubber sheeting made by the present invention is kept uniform within very narrow limits.

The accompanying drawing shows an apparatus for carrying on the process and illustrates the various steps through which the foamed latex passes in producing sheeting.

In the apparatus shown in the drawing, foamed latex is supplied as at 1 to an endless belt 2 passing about rollers 3 and 4 and is drawn underneath a gage or doctor blade 5 which spreads the foamed latex to a layer as at 6, several times the thickness of the sheet to be made. The layer of foamed latex then passes through a heating chamber 7 in which it is gelled and set. At this stage the belt is supported by a table 8 over which it passes. As the belt, and its layer of foamed latex, pass along the table 8 it passes beneath a succession of rollers 9, 10 and 11 and the layer of foamed latex is compressed to progressively smaller thicknesses. The compacted sheet 6, while still somewhat porous, passes through successive calender rolls 12, 12 and 13, 13 where it is compacted to a substantially non-porous sheet and the serum is expelled from the compacted sheet.

What we claim is:

1. A process for the production of compact and non-porous rubber sheeting from frothed aqueous dispersions of rubber and the like which comprises applying the frothed aqueous rubber dispersions substantially uniformly to a backing surface, setting the froth to a spongy or cellular structure of irreversible material, compacting the spongy or cellular structure by pressure to collapse the foam and further to reduce its thickness whilst the material is still in a wet condition and drying the thus compacted and non-porous rubber sheeting.

2. A process as claimed in claim 5 in which the frothed dispersion contains zinc oxide.

3. A process as claimed in claim 5 in which the frothed dispersion contains vulcanising ingredients.

4. A process as claimed in claim 1 in which the dried sheet is further consolidated.

5. A process for the production of compact and porous sheeting from frothed non-aqueous rubber dispersion containing a gelling agent which comprises applying the frothed aqueous dispersion of rubber to a surface, gelling the froth to a cellular structure of irreversible material, sufficiently compacting the spongy or cellular structure by pressure whilst the material is still in wet condition to collapse said structure and to expel water and soluble material therefrom and drying the thus compacted and non-porous rubber sheeting.

6. The process of claim 5 in which the aqueous dispersion of rubber contains a vulcanizing ingredient and in which the dried compacted rubber sheeting is vulcanized.

7. A process for the production of compact and non-porous rubber sheeting which comprises frothing an aqueous dispersion of rubber composition to a cellular structure, spreading the resulting cellular aqueous dispersion to a substantially uniform thickness, gelling the spread cellular dispersion by means of a gelling agent, sufficiently compacting the cellular structure by pressure whilst the material is still in a wet condition to expel water and soluble material therefrom, further compacting said material to cause it to spread and drying the resulting compacted non-porous rubber sheeting.

8. Rubber sheeting having equal resistance to tear in all directions and being non-porous and substantially free of grain, said rubber sheeting comprising coagulated unmasticated latex rubber from which serum constituents have been substantially expressed and formed by collapsing freshly coagulated foamed latex and thereafter further compacting to expel serum constituents.

EVELYN WILLIAM MADGE.
FRANK THEODORE PURKIS.

CERTIFICATE OF CORRECTION.

Patent No. 2,336,944.   December 14, 1943.

EVELYN WILLIAM MADGE, ET AL.

It is hereby certified that error appears in the printed specification of the above numbered patent requiring correction as follows: Page 2, second column, line 27-28, claim 5, for "porous sheeting from frothed non-aqueous rubber" read --non-porous sheeting from frothed aqueous rubber--; and that the said Letters Patent should be read with this correction therein that the same may conform to the record of the case in the Patent Office.

Signed and sealed this 28th day of March, A. D. 1944.

Leslie Frazer (Seal)   Acting Commissioner of Patents.